Patented Oct. 9, 1934

1,976,572

UNITED STATES PATENT OFFICE 1,976,572

COATING COMPOSITION

Gerald H. Mains, Murrysville, Pa., assignor to Westinghouse Electric & Manufacturing Company, a corporation of Pennsylvania No Drawing. Application June 14, 1929, Serial No. 371,067

8 Claims. (Cl. 134—26)

My invention relates to resins and to liquid coating compositions containing the resin as a base and, more particularly to a varnish containing a phenolic condensation product.

An object of my invention is to prepare a liquid coating composition that shall be composed of cheap and readily obtainable ingredients which possesses special properties that render it highly desirable for use as a varnish for impregnating sheets of material that are subsequently molded, under heat and pressure, to form composite plates.

Another object of my invention is to provide a varnish comprising a phenolic condensation product that is formed by the reaction of formaldehyde and phenolic bodies of such type that the reaction may be readily controlled and will proceed uniformly to completion without the aid of a catalytic agent.

A further object of my invention is to produce a resin that shall be formed by the reaction of formaldehyde and a mixture of phenolic bodies, including a substantial amount of xylenol and in which the amount of ortho cresol is less than 5%.

In my copending application disclosing certain novel subject matter in common with the present application, Serial No. 211,257, filed on August 6, 1927, now Patent No. 1,730,857, I have described a process of producing a liquid coating composition containing a resin produced by the reaction of formaldehyde, China-wood oil and a coal-tar acid containing from 5 to 20% of xylenol. For certain purposes, the coating composition described in the above application has been highly satisfactory because the China-wood oil imparts a certain flexibility to the molded product that enables it to be readily sheared and punched.

In certain types of laminated products, however, such as Micarta trays, which are now being manufactured and sold in large quantities, the sheets are first cut to the desired size, impregnated with a phenolic condensation product and then molded, under heat and pressure, into the finished article, and, since no punching operation is involved, flexibility is not a requisite property; in fact, it is essential that such products shall be rigid in structure in order to serve the purpose for which they are designed.

It has also been proposed to utilize a commercial cresylic acid in preparing phenolic condensation products without the aid of a catalytic or an accelerating agent. Such cresylic acids are usually composed of about ⅔ meta and para cresols and about ⅓ ortho cresol, with perhaps a small percentage of the higher-boiling phenols.

Condensation products prepared from the above ingredients have not proved entirely satisfactory. It has been found that ortho cresol does not produce a potential infusible condensation product with formaldehyde that is sufficiently reactive for utilization in certain types of varnishes, and when an attempt has been made to employ a cresylic acid containing meta and para cresol, the reactions have been slow and uncertain and uniform products have not been obtained.

I have made the discovery that, if the ortho cresol is removed from a cresylic acid containing ortho, meta and para cresols by any suitable means, such as by distillation, and from 5 to 25% of xylenol is added, a mixture of phenolic bodies will be obtained which will react with formaldehyde to form a satisfactory condensation product without the aid of a catalyst.

For economical reasons, however, I prefer to utilize a commercial coal-tar acid that is inexpensive and available in large quantities and to mix this acid with a sufficient quantity of meta-para cresols so that a mixture will be obtained that shall contain the desired proportion of xylenol. The coal-tar acid referred to is an imported acid, the specifications for which are that not more than 2% shall distill below 200° C. and not more than 75% shall distill below 215° C. It contains about 75% of meta and para cresols and from 20 to 25% xylenols, a small percentage of ortho cresols and other impurities. It remains liquid at low temperatures, is more reactive and less expensive than meta-para cresol and, when mixed with the desired proportion of meta-para cresols, is far superior to cresylic acid containing ortho, meta and para cresols. The presence of xylenol in the coal-tar acid so accelerates the reaction that the process is completed in a shorter period of time and, if the xylenol is present within certain well defined proportions, a resin is produced that is uniform and easily controlled.

While I have specifically mentioned a particular coal-tar acid, it will be understood that I do not desire to limit myself thereto, as any coal-tar acid may be employed that has substantially the same distillation range or contains from 5 to 25% xylenol, provided ortho cresol is not present in an amount exceeding 5%.

By adding a mixture of meta-para cresols to the coal tar acid above described, it will be apparent that the proportions of xylenol in the resulting composition may be easily regulated. I have found that a mixture containing from 5% to 25% xylenol is satisfactory, although the proportion of coal-tar acid utilized will depend upon the composition of such acid and the purity of the meta-para cresol.

The following specific example will serve to illustrate the method of producing my improved resin. The ingredients, proportions and temperatures therein stated are well adapted for this purpose and give excellent results. It will be understood, however, that the example is merely illustrative and that the proportions may be varied to a limited extent. If they are varied considerably, however, only fair results will be obtained.

75 parts by weight of a coal-tar acid containing about 75% meta-para cresol and from 20% to 25% xylenol, 25 parts by weight of commercial meta-para cresol and 80 to 100 parts of a commercial 37% formaldehyde solution are mixed together and heated under a reflux condenser at 90° to 100° C. for approximately two hours while being constantly stirred. The excess water and formaldehyde are then distilled off under vacuum, this process requiring a period of about two hours. After removing the major portions of the water, the resinous liquid is boiled in a thickening kettle until the viscosity has reached the desired stage. This point may be determined by chilling samples in ice water and examining them or by reading the viscosity directly on a special viscosimeter immersed in the resin, such as that described in copending application, Serial No. 114,370, filed on June 7, 1926, in the name of Fernald S. Stickney and assigned to Westinghouse Electric and Manufacturing Company. For example, when a sample of the material placed in ice water forms a clear hard ball, it is an indication that the desired viscosity has been reached. The condensation reaction has progressed to such an extent, at this stage, that the total solids represent about 90% of the mixture.

The temperature of the mixture in the thickening kettle, during boiling, varies from 100° to 140° C., gradually rising to the upper limit as polymerization of the condensation product takes place and as traces of water and any excess of formaldehyde and uncombined cresol or xylenol are removed. An exothermic reaction takes place toward the end of the thickening period, and the heat is decreased, or entirely removed or even cooling may be resorted to, if necessary, to keep the mixture below 140° C. This thickening period may require from two to four hours, depending upon the amount of water removed in the vacuum process and upon the efficiency with which the fumes are withdrawn from the surface of the boiling liquid, which is accomplished by any suitable means, such as an exhaust stack.

When the end of the thickening period is reached, the reaction proceeds rapidly, so that samples must be taken, or readings made on the viscosimeter, at frequent intervals to determine the end point, whereupon the condensation product is poured into chilled pans to obtain a potentially infusible resin, or, if it is desired to produce a varnish, it is discharged into a quantity of solvent which chills and dilutes it and arrests the reaction. It is sometimes found necessary to resort to artificial means to keep the solvent cool. The end point is determined by means of the viscosimeter, or by the ice-water test mentioned above, and, when it is reached, it is necessary to arrest the reaction immediately, otherwise polymerization takes place so rapidly that the resin will be transformed, in a few minutes, into a solid and substantially infusible mass. If the mixture is removed before the proper end point is reached, the viscosity of the resin will be low, and its reaction, under heat and pressure, when subsequently employed in molding operations, will be slow and unsatisfactory.

The solvent ordinarily used consists of 75% benzol and 25% of an aliphatic alcohol, although these proportions may range from 60% to 90% benzol, and from 10% to 40% of the alcohol, which may be any one of the members of the lower series of monohydric aliphatic alcohols, such as methyl, ethyl, propyl, etc. A mixture of a cyclic hydrocarbon of the benzene series, such as toluene or xylene with any one, or with a mixture of two or more, of the above-mentioned alcohols also produces a satisfactory solvent. Anhydrous alcohol and furfural may be used as solvents, but anhydrous alcohol is relatively expensive and, when furfural is used as the sole solvent, polymerization of the hot mixture tends to take place. A mixture of furfural and alcohol, however, is a very good solvent.

An example of the composition of my preferred varnish is given below:

|  | Per cent |
|---|---|
| Resin | 60 |
| Benzol | 30 |
| Alcohol | 10 |
|  | 100 |

It will be understood, however, that the above example is given merely as an illustration, as the ingredients in the solvent, as well as the proportion of resin to solvent, may be widely varied.

In making special molded articles, potential hardening agents, such as hexamethylenetetramine, paraform or furfuramid, may be added to the varnish in the proportion of about ¼% to 1%, but their presence is undesirable when the hot resin is discharged from the mixer into the solvent or the chilled pans and, for ordinary molding operations, their presence is neither essential nor desirable.

If sheet material impregnated with this varnish is cut to the desired size and molded in a hydraulic press under a pressure of about 1,000 to 3,000 pounds per square inch and at a temperature of about 140° to 180° C., a substantially insoluble laminated product is formed. Composite material, such as plates or trays, which are molded from sheets of paper or cloth impregnated with my improved varnish are strong and rigid and have a distinct advantage over sheets of material impregnated with ordinary phenolic condensation products or those described in my copending application because they are more resistant to water or soap solutions.

While I have set forth my invention by describing the specific process in which a coal-tar acid, a mixture of meta-para cresols and formaldehyde are combined to form the resin embodied in my varnish and have also described, in detail, the composition of a completed varnish, it is to be understood that my invention is not limited to the use of the exact proportions, as they may be varied considerably. It will of course be understood that the polymers of formaldehyde may be substituted for formaldehyde and that the term xylenol includes any one of the isomeric forms or a mixture of two or more of such xylenols. I desire, therefore, that only such limitations shall be imposed upon my invention as are indicated in the appended claims.

I claim as my invention:

1. A resin consisting essentially of the reaction product of formaldehyde and a mixture of meta-para cresols and a coal-tar acid containing a substantial amount of xylenol, not more than 2% of said coal-tar acid being distillable below 200° C. and not more than 75% being distillable below 215° C.

2. A resin consisting essentially of the reaction product of formaldehyde and a mixture of phenolic bodies containing a major proportion of para and meta cresols and a substantial proportion of xylenol but not more than 5% of ortho cresol.

3. A resin resistant to water penetration consisting essentially of the reaction product of formaldehyde and a mixture of phenolic bodies containing a major proportion of meta and para cresols and from 5% to 25% xylenol but not more than 5% of ortho cresol.

4. A liquid adapted to form a coating resistant to water penetration consisting essentially of a resin formed by the reaction of formaldehyde and a mixture of phenolic bodies substantially free from ortho cresol and including approximately 75% meta and para cresols and from 10% to 25% xylenol and a solvent for the resin containing aliphatic alcohol and benzol.

5. The process of making a resin which consists of heating together without a catalyst a mixture containing a major proportion of meta and para cresols substantially free from ortho cresol, 5% to 25% xylenol and a methylene containing substance.

6. A process of making a resin which consists of heating together formaldehyde and a mixture of phenolic bodies substantially free from ortho cresol and containing essentially meta and para cresols and from 5% to 25% xylenol.

7. The process of preparing a liquid composition adapted to form a coating resistant to water penetration which consists of heating together in a condenser, formaldehyde and a mixture of phenolic bodies substantially free from ortho cresol and containing a preponderant amount of meta para cresols and 5% to 25% of xylenol distilling off any excess water uncombined acid and formaldehyde, boiling in a thickening kettle between 100° C. and 140° C. until a sample of the material placed in ice water forms a clear hard ball and then discharging the resin into a solvent.

8. The process of preparing a liquid composition adapted to form a coating resistant to water penetration which consists of forming a fusible condensation product from formaldehyde and a mixture of phenolic bodies containing less than 5% ortho cresol and containing upwards of 75% meta para cresol and from 10% to 25% xylenol and thickening the product by boiling at a temperature lower than 140° C. until 90% of the mass is solid and then arresting further action by chilling in liquid consisting essentially of a cyclic hydrocarbon and an aliphatic alcohol.

GERALD H. MAINS.